(12) United States Patent
Geborek et al.

(10) Patent No.: US 7,333,883 B2
(45) Date of Patent: Feb. 19, 2008

(54) LOGIC AND A METHOD FOR DETECTING A VEHICLE ROLLOVER

(75) Inventors: Mariusz Geborek, Krakow (PL); Abtin Darvish, Wuppertal (DE); Jens Haun, Bochum (DE)

(73) Assignee: Delphi Technologies, Inc., Troy, MI (US)

( * ) Notice: Subject to any disclaimer, the term of this patent is extended or adjusted under 35 U.S.C. 154(b) by 264 days.

(21) Appl. No.: 11/039,147

(22) Filed: Jan. 19, 2005

(65) Prior Publication Data
US 2005/0159872 A1    Jul. 21, 2005

(30) Foreign Application Priority Data
Jan. 19, 2004    (PL)    ..................... 364449

(51) Int. Cl.
*G06F 17/00*    (2006.01)
*B60R 21/16*    (2006.01)

(52) U.S. Cl. ................. 701/45; 340/438; 280/734; 280/735

(58) Field of Classification Search ............ 701/45–49, 701/301, 36; 340/425.5, 438, 440, 429; 180/283; 307/9.1, 10.1; 280/728.1, 734, 735
See application file for complete search history.

(56) References Cited

U.S. PATENT DOCUMENTS

| 6,535,800 B2 | 3/2003 | Wallner |
| 6,542,073 B2 * | 4/2003 | Yeh et al. ................... 340/440 |

* cited by examiner

*Primary Examiner*—Yonel Beaulieu
(74) *Attorney, Agent, or Firm*—Jimmy L. Funke

(57) ABSTRACT

A logic for detecting vehicle rollover includes a first main activation path activated by vehicle lateral acceleration and a second main activation path activated by vehicle vertical acceleration. The logic also includes a first additional activation path activated by vehicle roll angle, a second additional activation path activated by vehicle roll rate, and a third additional activation path activated by vehicle longitudinal acceleration. Activation of each path results from the sensor specific for that path when the output exceeds a threshold value. Logic activation occurs when at least one main activation path and at least one additional activation path are activated.

18 Claims, 3 Drawing Sheets

LOGIC AND A METHOD FOR DETECTING A VEHICLE ROLLOVER

TECHNICAL FIELD

The present invention relates to a logic and a method for detecting a vehicle rollover or dangerous situations that may precede a rollover of a vehicle.

BACKGROUND OF THE INVENTION

Rollover detection logics circuits are connected with proper sensors and are a used in rollover detections systems, which aim is to deploy an occupant protection devices such as seat belts pretensioners, pop-up roll bars or air bags, especially air bags protecting occupants' heads during a rollover accident.

In many rollover detection systems there are two paths of signal transmission: a main path and an independent arming path, being separate safety logic. An essential purpose of safety logic is to decrease the probability of inadvertent deployment in an event of failure or error in main rollover detection logic. An example of such a system is disclosed in U.S. Pat. No. 6,535,800.

Publication WO 03/010034 discloses a rollover determination system comprising a first roll rate sensor, a lateral acceleration sensor and a main controller that determines, whether there is a possibility of rollover of the vehicle on the basis of the roll rate and lateral acceleration of the vehicle. The system comprises also a safety logic for confirming a rollover accident, whose output is summed with an output signal of the main rollover detection logic by means of an AND gate.

An activation of the main rollover detection logic which is not accompanied with an activation of safety logic implies a failure of main logic and may lead to its turning off, which is commonly indicated by flashing a proper control signal on a vehicle control panel.

SUMMARY OF THE INVENTION

The aim of the present invention is to provide a logic and a method for detecting a vehicle rollover, which would generate an activation signal during a vehicle rollover or near rollover event, would be resistive for mechanical vibrations and would be substantially inactive during a normal driving conditions not threatening a rollover.

Another aim of the present invention is a logic and a method for detecting a vehicle rollover, applicable as an additional safety solution for a rollover detection systems with no need of their substantial modification.

According to the present invention there is provided a logic for detecting a vehicle rollover comprising the first main activation path, which is activated if a signal of a vehicle lateral acceleration sensor exceeds a predefined threshold value; the second main activation path, which is activated if a signal of a vehicle vertical acceleration sensor exceeds a predefined threshold value; and the first additional activation path, which is activated if a vehicle roll angle exceeds a predefined threshold value and a signal of a vehicle roll rate sensor exceeds a predefined threshold value; the second additional activation path, which is activated if a vehicle roll rate sensor exceeds a predefined second threshold value, wherein the activation of the logic depends on the activation of individual activation paths and for the activation of the logic at least one main activation path must be activated.

Advantageously according to the present invention a logic further comprises the third additional activation path, which is activated if a signal of a vehicle longitudinal acceleration sensor exceeds a predefined threshold value.

In a preferred embodiment of the logic according to the present invention an activation of at least one main activation path and at least one additional activation path is sufficient for the activation of the logic.

In an alternative advantageous embodiment of the logic according to the present invention an activation of the first main activation path, or the second main activation path and at least one additional activation path is sufficient for the activation of the logic.

It is advantageous to connect the logic according to the present invention with at least one protection device for an occupant of a vehicle. The term "protection device" as used herein denotes in particular seat belts pretensioners, pop-up roll bars or air bags.

In such a case the activation signal of the logic shall be advantageously additionally processed before activation of said protection devices.

As the logic according to the present invention is a relatively simple solution, there is a high probability of its activation in a dangerous situation, that may not necessarily end up with a vehicle rollover. Typically, an additional processing of the activation signal shall be its comparing with an activation signal of another logic having another algorithm of operation by an AND gate and triggering an appropriate protection device, e.g. deploying an air bag only if both logics are active. In such a realisation, the logic of the invention may be used as an additional safety logic for existing rollover detection systems which shall be explained in details below in exemplary embodiment.

Alternatively the activation signal of the logic may be a direct signal to activate said protection devices.

Suitable here are naturally repeatable protection devices, that activate in a potentially dangerous situation and return to its steady state, shall it pass, such as e.g. mechanical resetable seatbelts pretensioners.

It is advantageous if the activation signal of at least one activation path is sustained for a predefined period.

Benefiting from above feature the activation of the safety logic takes place even if particular activation paths do not activate in the same time. Latching times should be adjusted individually for each vehicle, the logic is used in.

Moreover it is advantageous if the input value of at least one activation path is pre-processed.

Such a pre-processing advantageously involves at least signal scaling, removing a sensor drift and/or filtering a signal.

Since a logic according to the present invention may be used either as an additional safety microcontroller in existing rollover detection systems or as a separate device it is advantageous, especially in this second case, if it comprises at least one sensor chosen from a lateral acceleration sensor, a vertical acceleration sensor, a roll rate sensor, a roll angle sensor and a longitudinal acceleration sensor.

According to another aspect of the present invention there is provided a method of determining a rollover of a vehicle, said method comprising the steps of: detecting a lateral acceleration of a vehicle and activation of the first main activation path if it exceeds a predefined threshold value; detecting a vertical acceleration of a vehicle and activation of the second main activation path if it exceeds a predefined threshold value; and detecting a roll angle and a roll rate of a vehicle and activation of the first additional activation path if these values simultaneously exceed a predefined threshold values; activation of the second additional activation path if a roll rate of a vehicle exceeds a predefined second threshold value; generating an output activation signal determining a possibility of rollover of the vehicle, in dependence of activation of individual activation paths, wherein for generating an output activation signal the activation of at least one main activation path is necessary.

A method preferably further comprises the step of detecting a longitudinal acceleration of a vehicle and activation of the third additional activation path if it exceeds a predefined threshold value.

In an advantageous implementation of the method according to the invention an activation of at least one main activation path and at least one additional activation path is sufficient for generating an output activation signal.

In an alternative advantageous implementation of the method according to the invention an activation of the first main activation path, or the second main activation path and at least one additional activation path is sufficient to generate an output activation signal.

It is also advantageous if the method further comprises the step of activation at lest one protection device for an occupant of a vehicle, wherein said output activation signal may be either additionally processed before activation of said protection devices or be a direct signal to activate said protection devices.

BRIEF DESCRIPTION OF THE DRAWINGS

A logic of the present invention is presented below by way of examples of preferred embodiments with reference to figures of the drawing in which.

DESCRIPTION OF THE PREFERRED EMBODIMENT

Figure 1:
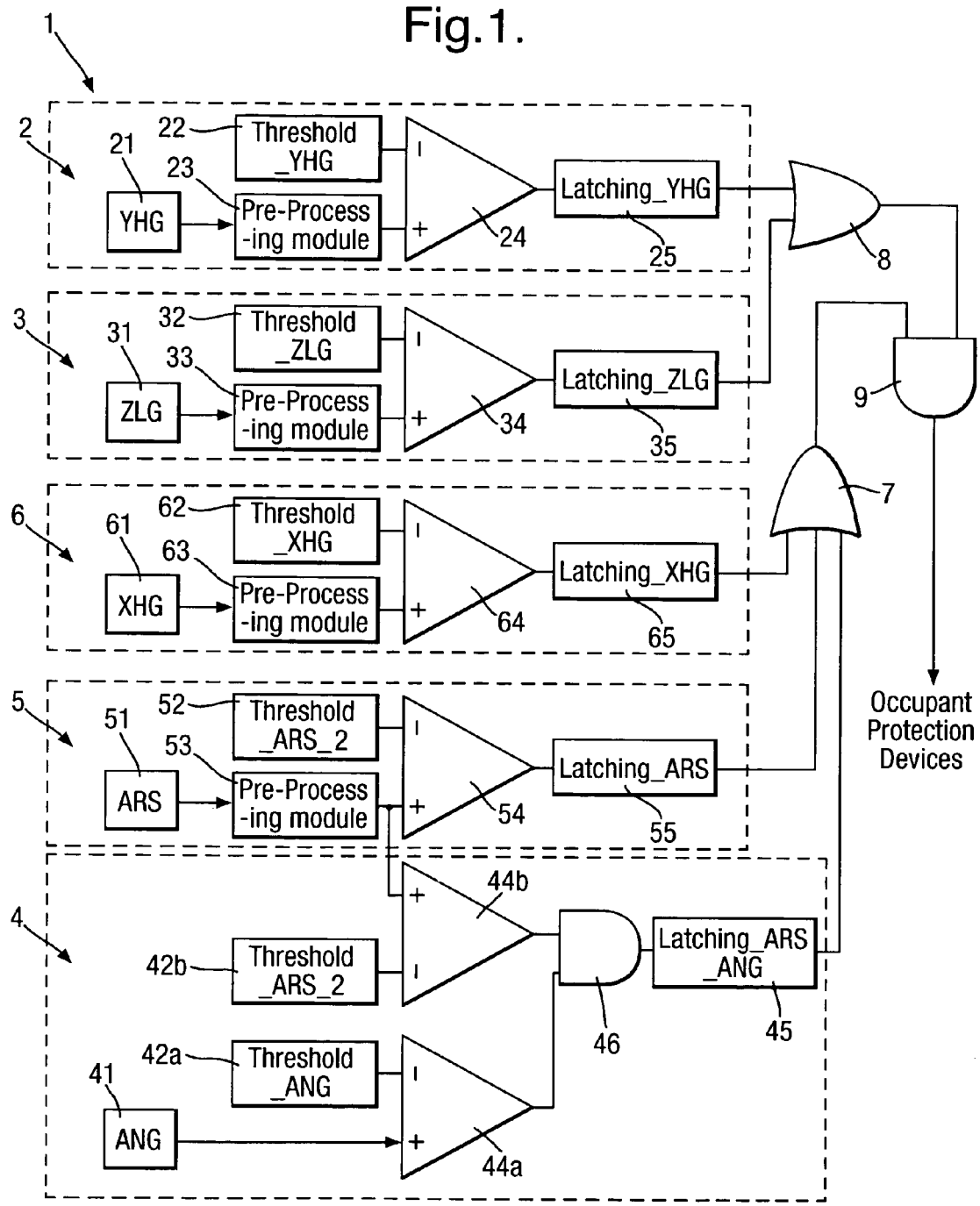
FIG. 1 is a block and circuit diagram of a rollover detection logic according to the present invention.
Figure 4:
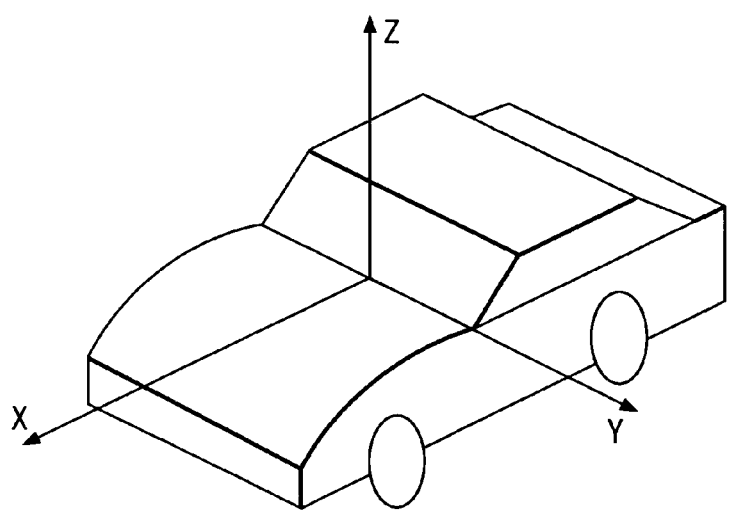
FIG. 4 shows a coordinate system XYZ associated with the vehicle.

As shown in FIG. 1 the safety logic 1 comprises two main activation paths: a main high lateral acceleration path (referred below as YHG) 2 and a main low vertical acceleration path (referred below as ZLG) 3. The assumed shortened notation is a consequence of an assumed coordinate system XYZ associated with the vehicle, as shown in FIG. 4.

The first main activation path YHG 2 is activated for example, during the soil trip, side-collision or a curb trip of vehicle. The input sensor of the main activation path 2 is a vehicle lateral acceleration sensor (YHG) 21 fixed in the vehicle in such a way that its working axis is perpendicular to the longitudinal and vertical axis of the vehicle. This sensor may be, e.g., sensor of the type ADXL50 made by Analog Devices, Inc, USA. Sensor of this type is capable for detecting accelerations in the range from 0 g to about ±50 g. A sensor signal 21 is pre-processed in a pre-processing module 23. Then an absolute value of the output signal of the module 23 is compared in comparator 24 with a predefined threshold value 22 ("threshold_YHG"). If a vehicle lateral acceleration exceeds a predefined threshold value, TRUE logic signal occurs at the output of comparator. By predefining a value "threshold_YHG" in the range from ±2 g to ±3 g it is possible to detect some dangerous situations without activation the logic during a normal driving conditions. A greater accelerations are usually accompanied with a vehicle rollover, near rollover event or other dangerous situation. Afterwards the output value of the comparator 24 is sustained for a predefined period in the module 25 ("latching_YHG") and becomes the first input of the OR gate 8.

The second main activation path ZLG 3 is activated, for example, when vehicle is falling into a ditch or during driving with a big bank. The input element of path 3 is a vehicle vertical acceleration sensor (ZLG) 31 the working axis of which is parallel to the vertical axis of the vehicle. The sensor is capable to detect low acceleration in the range from 0 g to ±2 g. The signal of the sensor 31 is processed in the pre-processing module 33, then an absolute value of the output signal of the module 33 is compared in the comparator 34 with a predefined threshold value 32 ("threshold_ZLG"). If a vehicle vertical acceleration exceeds a predefined threshold value, the TRUE logic signal occurs at the output of comparator 34. It can be assumed that a bank of vehicle at an angle of 45 degrees in relation to a horizontal surface is a dangerous situation which can cause a vehicle rollover. To detect this situation the value "threshold_ZLG" should be set to about −0.7 g. It corresponds to a gravitation component acting on the sensor ZLG (g* cos (45°)). The filtered value is compared with the value of "threshold_ZLG" so that the TRUE signal will occur at the output of the comparator 34 only when the bank of vehicle exceeds 45 degrees. An output value of the comparator 34 is sustained for a predefined period in the module 35 ("latching_ZHG") and becomes the second input of the OR gate 8.

The output of the gate 8 is connected with the input of AND gate 9, so that the activation of the path YHG 2 or the path ZLG 3, will lead to a logic activation signal on one of the inputs of the gate 9.

In order not to cause random logic activation during a normal driving conditions, safety logic 1 has three additional activation paths: the first 4, the second 5 and the third 6 activation path. The output signals of these paths becomes inputs of the OR gate 7. Then the output of gate 7 is the second input of AND gate 9. A TRUE signal at the output of the gate 9 is a logic activation signal 1.

Figure 2:
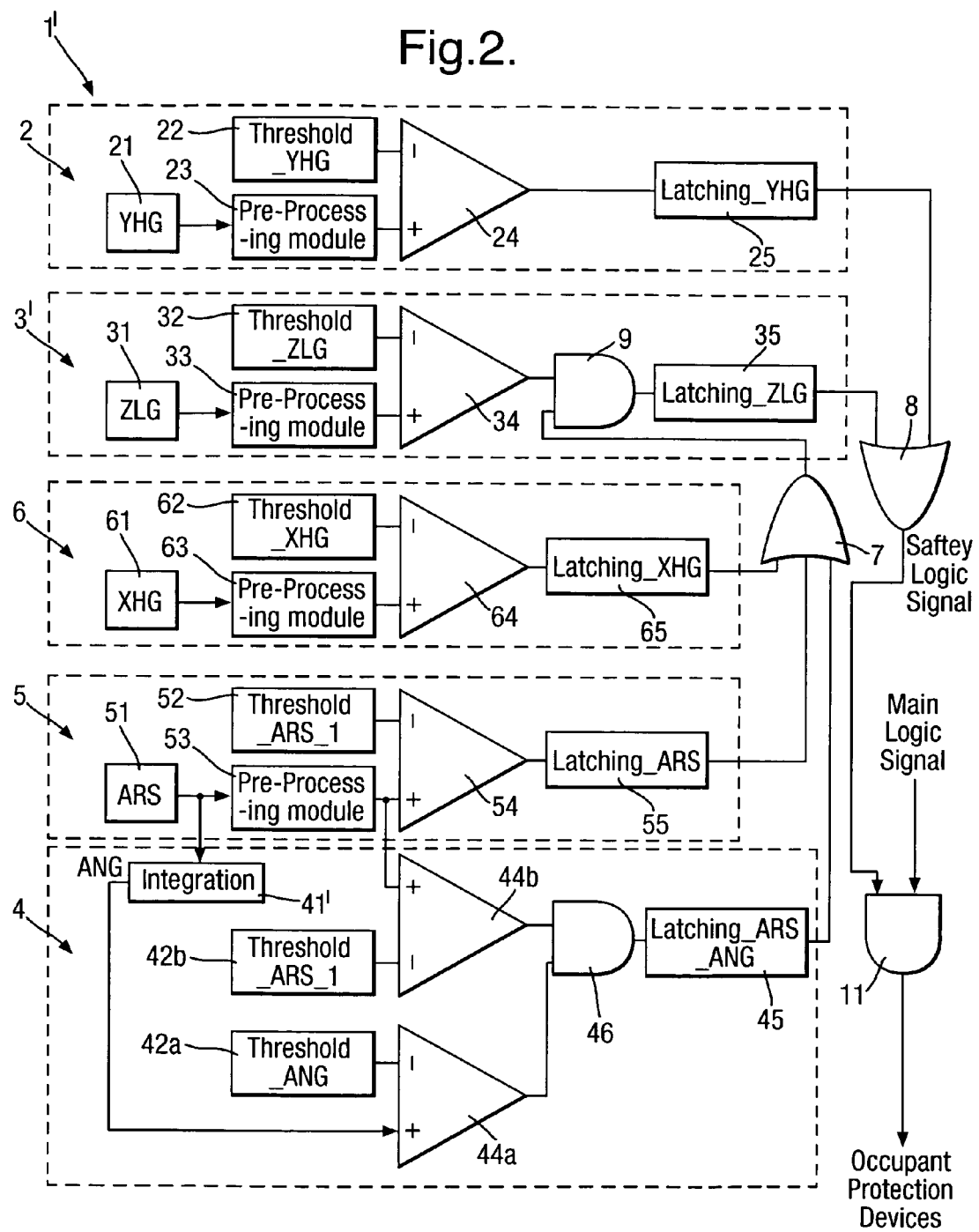
FIG. 2 is a block and circuit diagram of another embodiment of a rollover detection logic according to the present invention.

The input signals of the first additional activation path 4 are a value roll angle of vehicle (ANG) and a pre-processed signal of the sensor 51 of the path 5. The roll angle of vehicle can be measured, for example, by using an inclinometer 41. However, this value is preferably determined by means of an integration of a signal of a roll rate that is provided by sensor 51 in the module 41', as shown in FIG. 2.

If the absolute value of roll angle ANG, exceeds the value 42a ("threshold_ANG") so that TRUE value will appear at the output of the comparator 44a, and at the same time an absolute processed value of a signal of sensor ARS 51 exceeds value 42b ("threshold_ARS_1"), causing activation of comparator 44b, at the inputs of AND gate 46 appear simultaneously two TRUE values. Consequently, at the output of gate 46 there will appear TRUE value signal which will be sustained by the module 45 for a predefined period "latching_ARS_ANG". By setting up the value "threshold_ANG" to about 25° and the value "threshold_ARS_1" to about 10°/s, the path 4 shall be activated only when the roll angle of the car exceeds 25° and the vehicle roll rate exceeds 10°/s.

An angular rate sensor (ARS) 51 is an input element of the second additional activation path 5. The sensor 51 can be, for example micro sensor of the type ADXRS300 produced by Analog Devices, Inc, USA. The path 5 is activated when the absolute value of signal of sensor 51, after pre-processing by the module 53, exceeds the threshold value 52 ("threshold_ARS_2"). It may happen, for example, during a vehicle rollover which drives at high enough speed. During simulation tests it takes place during ramp test and other similar rollover schemes, when the first additional activation path 6 is not yet activated. By setting up the value "threshold_ARS_2" for example, to about 50°/s, on the comparator 54 the TRUE signal will appear when the angular rate exceeds this threshold. The path 5 shall be active for a predefined period ("threshold_ARS").

The output element of the third additional activation path 6 is a vehicle longitudinal acceleration sensor (XHG) 61 (for example sensor of the type ADXL202E made by Analog Devices. Inc.), having the working axis parallel to the longitudinal axis of a vehicle. An absolute signal value of the sensor 61, after pre-processing by module 63, is compared in the comparator 64 with a predefined threshold value 62 ("threshold_XHG"). At the output of the comparator 64 there shall appear the TRUE signal, if pre-processed absolute value of the signal of the sensor 61 exceeds the value "threshold_XHG". The signal of the comparator 64 is sustained by the module 65 for predefined period ("latching_XHG"). By setting up the value "threshold_XHG" e.g. to about 20 g, at the output of the gate 7 the TRUE signal appears only during big accelerations acting along the longitudinal axis of the vehicle, such as e.g. front or back collisions. In the alternative embodiment of the safety logic it is possible to entirely resign with the activation path 6.

The purpose of pre-processing modules 23, 33, 43 and 53 is signal scaling, removing a sensor drift and broad-band filtering a signal to remove a noise of sensor signal before numerical sampling.

The first 4, the second 5 or the third 6 additional activation path shall be activated only during specific driving conditions, that may precede rollover the car. During normal driving conditions, usually none of the paths shall be activated. In the result at the input of the gate 9 shall not appear a TRUE signal and the logic will not be activated.

The output of the gate 9 can be connected with occupant protection devices such as seat belts pretensioners, not shown in the drawing. FIG. 2 shows a slightly different embodiment of safety logic 1'. The reference numerals of the elements performing the same functions correspond to those in FIG. 1.

In this example a little different configuration of output gates is used. In this case an activation of the first main activation path YHG 2, the output of which is the first input of OR gate 8, is sufficient for the activation of the safety logic.

As in the embodiment shown in FIG. 1, the activation signals of additional activation paths 4, 5 and 6 are the inputs of the OR gate 7, but the output of the gate 7 is connected with the input of the AND gate 9, the second input of which is the output of the comparator 34 of the second main activation path 3'. The value of the "threshold_ZLG" 32 was set up to about −0.85 g that results in high sensitivity of the ZLG path to vertical vibrations occurring e.g. during driving on roughness road, but the second main activation path 3' will be activated only when, besides activation of the comparator 34, at least one additional activation path 4, 5 or 6 is active.

The output of the gate 9 is sustained by the module 35 for a predefined period ("latching_ZLG") and is the second input of the OR gate 8. The Table 1 below shows preferred ranges of calibration parameters of safety logic shown in FIG. 2 and their example values. The right choice of these parameters depends on a lot of factors, like for example a wheel track, a mass, a position of centre of gravity, or a moment of inertia of a vehicle.

TABLE 1

| Calibration parameter | Preferred range | Example value |
| --- | --- | --- |
| ZLG_threshold | from −0.7 to −0.92 [g] | −0.85 g |
| ZLG_latching_time | from 0.1 to 0.8 [s] | 0.4 s |
| YHG_threshold | from 1.5 to 5 [g] | 2.5 g |
| YHG_latching_time | from 0.04 to 0.12 [s] | 0.12 s |
| XHG_latching_time | from 0 to 0.20 [s] | 0 s |
| ARS_latching_time | from 0 to 0.20 [s] | 0 s |
| ARS_ANG_latching_time | from 0 to 0.20 [s] | 0 s |
| XHG_threshold | from 5 to 30 [g] | 5 g |
| ARS_1_threshold | from 2 to 15 [°/s] | 3°/s |
| ARS_2_threshold | from 15 to 60 [°/s] | 40°/s |
| ANG_threshold | from 25 to 40 [°] | 30° |

It should be obvious, that exemplary embodiments described above may be implemented either as electronic circuits having an appropriate comparators, filters and gates or by means of a suitable algorithm (method of operation) of an electronic control unit (ECU).

In practical applications it is favourable to employ two separate ECU units: main unit and an additional safety unit that may be a logic of the present invention. Main unit and safety unit may also be implemented in two separate microcontrollers, however in the same ECU.

A logic shown in FIG. 2 performs a function of an additional safety logic. The output of the gate 8 is connected with the input of the AND gate 11, the second input of which is the activation signal of the main logic, not shown on the drawing, that in general works according to more complicated algorithm. A suitable protection device shall be activated only when both logics are active.

Figure 3:
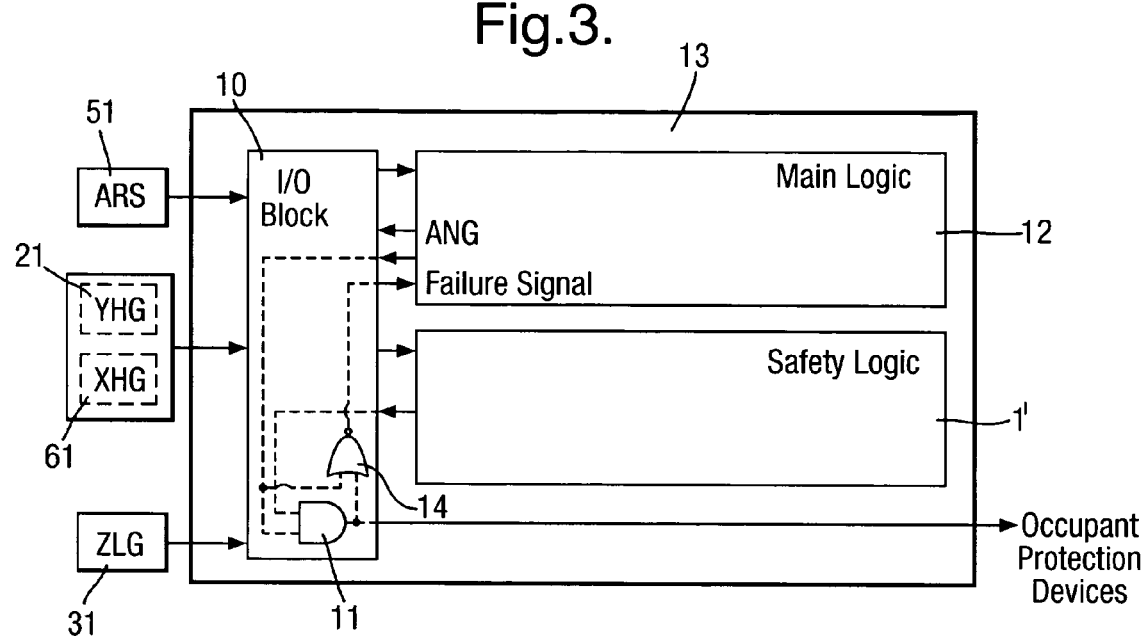
FIG. 3 is a block and circuit diagram of a control unit which is provided with a safety logic according to the present invention.

FIG. 3 shows an example of implementation of the rollover determination arrangement 13, comprising a safety logic 1', shown in FIG. 2. Two ECU microcontrollers have been used here: a main logic microcontroller 12 and a microcontroller of safety logic 1'. Both logics are connected to an input/output block 10, through which they collect required working variables from the vehicle roll rate sensors ARS 51, an integrated vehicle high acceleration sensor XHG 61 and YHG 21 and the vehicle vertical low acceleration sensor ZLG 31, which are also connected to the input/output block 10. A roll angle is measured by the main logic 12 through integration of a roll rate, then this value is delivered to the input/output block 10, and next, to safety logic 1'. The output of the main logic is coupled with the input of AND gate 11 that is built in the block 10. The second input of the gate 11 is coupled with the input of the safety logic 1'. For activation of appropriate protection devices, for example air-bag an activation of both logics is necessary. Additionally, the XOR gate 14 was built in the block 10 and was coupled with the output of the gate 11 and with the output of the main logic 12. The output of the gate 14 is coupled with the main logic. An activation of the gate 14 will occur during an activation of the main logic 12 without an activation of the safety logic, which indicates a failure in the rollover determination arrangement and will lead to turning off the logic.

The invention claimed is:

1. A logic for detecting a vehicle rollover comprises
a first main activation path that is activated if a signal of a vehicle lateral acceleration sensor exceeds a predefined threshold value;
a second main activation path that is activated if a signal of a vehicle vertical acceleration sensor exceeds a predefined threshold value;
a first additional activation path that is activated if a vehicle roll angle exceeds a predefined threshold value and a signal of a vehicle roll rate sensor exceeds a predefined threshold value;
a second additional activation path that is activated if the signal of the vehicle roll rate sensor exceeds a predefined second threshold value; and
a third additional activation path that is activated if a signal of a vehicle longitudinal acceleration sensor exceeds a predefined threshold value;
wherein activation of at least one of the first main activation path and the second main activation path and activation of at least one of the first additional activation path, the second additional activation path and the third additional activation path is needed for activation of the logic.

2. A logic as claimed in claim 1, wherein activation of the first main activation path or activation of the second main activation path and activation of at least one of the first, second or third additional activation paths is sufficient for the activation of the logic.

3. A logic as claimed in claim 1, wherein activation of the first main activation path, or activation of the second main activation path and at least one of the first, second or third additional activation path is sufficient for the activation of the logic.

4. A logic as claimed in claim 1, wherein the logic is connected with at least one protection device for an occupant of a vehicle.

5. A logic as claimed in claim 4, wherein the activation signal of the logic is additionally processed before activation of said protection device.

6. A logic as claimed in claim 4, wherein the activation signal of the logic is a signal to activate said protection device.

7. A logic as claimed in claim 1, wherein the activation signal of at least one activation path is sustained for a predefined period prior to activation.

8. A logic as claimed in claim 1 wherein the input value of at least one activation path is pre-processed.

9. A logic as claimed in claim 8, wherein the pre-processing involves at least signal scaling, removing a sensor drift and filtering a signal.

10. A method of determining a rollover of a vehicle, comprising the steps of:
detecting a lateral acceleration of a vehicle;
activating a first main activation path if the lateral acceleration exceeds a predefined threshold value;
detecting a vertical acceleration of a vehicle;
activating a second main activation path if the vertical acceleration exceeds a predefined threshold value;
detecting a roll angle and a roll rate of a vehicle;
activating a first additional activation path if the roll angle exceeds a predefined threshold value and simultaneously the roll rate exceeds a first predefined threshold value;
activating a second additional activation path if the roll rate exceeds a predefined second threshold value;
detecting a longitudinal acceleration of the vehicle;
activating a third activation path if the longitudinal acceleration exceeds a predefined value;
generating an output activation signal determining a possibility of rollover of the vehicle when at least one of the first main activation path and the second main activation path is activated and at least one of the first additional path, the second additional path and the third additional path is activated.

11. A method according to claim 10 wherein least one main activation path and at least one additional activation path is sufficient for generating an output activation signal.

12. A method according to claim 10 wherein activation of the first main activation path, or the second main activation path and at least one additional activation path is sufficient for generating an output activation signal.

13. A method according to claim 10, further comprising the step of activating at least one protection device for an occupant of a vehicle in response to the output activation signal.

14. A method according to claim 13, wherein said output activation signal is additionally processed before activation of said protection device.

15. A method according to claim 13, wherein said output activation signal is a signal to activate said protection device.

16. A method according to claim 10, wherein the activation signal of at least one activation path is sustained for a predefined period prior to activating the at least one activation path.

17. A method according to claim 10, wherein the input value of at least one activation path is pre-processed.

18. A method according to claim 17, wherein the pre-processing comprises one of signal scaling, removing a sensor drift and filtering a signal.

* * * * *